United States Patent [19]

Erhard

[11] Patent Number: 4,462,286
[45] Date of Patent: Jul. 31, 1984

[54] PORTABLE SLOTTING DEVICE

[75] Inventor: Herman H. Erhard, San Jose, Calif.

[73] Assignee: The United States of America as represented by the Secretary of the Air Force, Washington, D.C.

[21] Appl. No.: 452,605

[22] Filed: Dec. 23, 1982

[51] Int. Cl.³ ............................................. B23B 41/06
[52] U.S. Cl. ..................................................... 82/1.4
[58] Field of Search ..................... 82/1.2, 1.4; 408/127, 408/92, 93, 72

[56] References Cited

U.S. PATENT DOCUMENTS

| | | | |
|---|---|---|---|
| 941,568 | 11/1909 | Fleming | 145/124 |
| 1,698,861 | 11/1925 | Wadell . | |
| 1,928,529 | 4/1931 | Garrard | 82/2 |
| 2,317,230 | 4/1943 | Smith | 77/58 |
| 2,727,414 | 12/1955 | Badders | 82/1.4 |
| 2,920,443 | 1/1960 | Higginson | 60/35.6 |
| 2,945,404 | 7/1960 | Baumstark, Jr. et al. | 77/58 |
| 3,184,827 | 5/1965 | Melvin | 29/95 |
| 3,207,476 | 9/1965 | Brooks et al. | 254/126 |
| 3,309,869 | 3/1967 | Terry | 60/39.47 |
| 4,161,127 | 7/1979 | Tiffin | 82/1.4 |
| 4,218,941 | 8/1980 | David-Malig | 82/1.2 |

Primary Examiner—Leonidas Vlachos
Attorney, Agent, or Firm—Donald J. Singer; Stanton E. Collier

[57] ABSTRACT

A portable slotting device is used to cut a conical slot in a propellant grain of a rocket motor. A telescoping arm having a cutter thereon is mounted at an angle upon a rotating shaft held in position by a housing attached to said motor. Pressurized fluid is fed to the telescoping arm for providing the motive force to extend the cutter. A control cable is attached to one of two extension arms in the telescoping arm and to an adjusting knob. As the drive shaft is rotated, the adjusting knob is unthreaded from a rod having the control cable attached thus allowing the control cable to extend the telescoping arm. The pressurized fluid forces the extension arms out while the control cable restrains movement. The cutter thus moves in a spiraling conical motion paring out propellant grain.

5 Claims, 2 Drawing Figures

PORTABLE SLOTTING DEVICE

STATEMENT OF GOVERNMENT INTEREST

The invention described herein may be manufactured and used by or for the Government for governmental purposes without the payment of any royalty thereon.

BACKGROUND OF THE INVENTION

This invention relates generally to devices for forming voids within propellant grains, and, more particularly, to devices for forming voids after the grain has cured.

In order to improve burning characteristics of propellant grains, a variety of uniquely shaped voids are positioned in the grains. Voids amenable to extrusion or casting, such as stars, require no further shaping, but other shapes require elaborate machines in order to cut the voids into the grains. For example, a grain with a longitudinal cylindrical cavity may require a conical slot. In the past, this conical slot was machined into the grain with a vertical lathe having special cutters.

The use of a conventional lathe entailed the problems of transporting and positioning of the grain in the lathe. Grains of considerable weight magnify these problems, of course. Further, detailed setup procedures are required in the use of a conventional lathe. The time consumed in transporting, positioning, and setting up are essentially equal whether one cut or numerous cuts are involved. Thus, for example, only one slotting operation in the grain becomes very inefficient with the above lathe.

These drawbacks have motivated the search for alternative devices such as a slotting fixture that minimizes the time per operation of each grain.

SUMMARY OF THE INVENTION

The instant invention sets forth a hand portable slotting device that overcomes the problems set forth hereinabove.

The present invention is particularly suitable for use in a single grain rocket motor having a longitudinal cylindrical void running from the front to the rear.

The conical slotting device of the present invention mounts onto the motor case of the rocket motor and is operated by hand. The slotting device includes a cutter mounted on a telescoping arm attached at an angle to a drive shaft. A handle attached to the drive shaft provides rotary motion to the drive shaft and the cutter. The drive shaft is rotatably secured in a mounting plate that is attached to the motor case. Pressurized fluid is fed to the telescoping arm for driving the extension arm therefrom so that the cutter pares out a conical slot in the grain as rotary motion occurs. The amount of extension of the arm is controlled by a cable that is attached to a feed control on the drive shaft. By releasing the feed control more cable is fed to the telescoping arm. The cable restrains extension of the arm against the fluid pressure.

It is, therefore, one object of this invention to provide for a portable propellant slotting device; and It is a further object of this invention to provide for a conical slotting device.

These and many other objects and advantages of the present invention will be readily apparent to one skilled in the pertinent art from the following detailed description of a preferred embodiment of the invention and related drawings.

DETAILED DESCRIPTION OF THE PREFERRED EMBODIMENT

Figure 1:
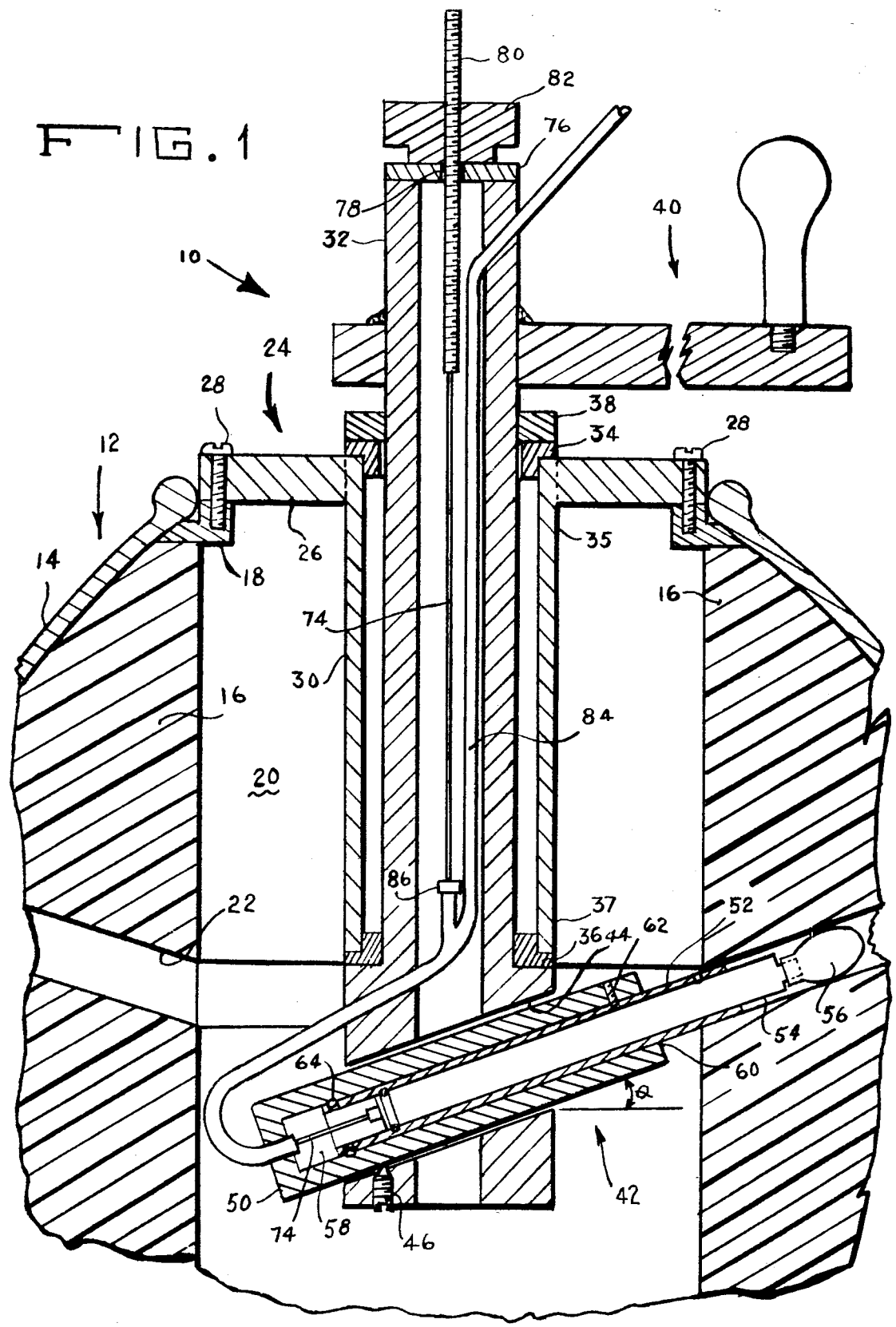
FIG. 1 is a cross-section of the conical slotting device of the present invention mounted on a rocket motor case.

Referring to FIG. 1, a conical slotting device 10 is shown fixedly attached to a rocket motor 12 having a bore 20 running longitudinally from top to bottom. Conical slotting device 10 through cutting action to be described hereinafter forms a conical slot 22 in propellant grain 16.

A housing 24 of conical slotting device 10 is attached to a polar fitting 18 of a motor case 14 by means of preferably bolting; although, other means are equally feasible provided housing 24 is rigidly held in place while attached to motor case 14.

Housing 24 has a mounting flange 26 through which mounting bolts 28 pass to polar fitting 18 and has a guide 30, preferably tubular shaped. Mounting flange 26 and guide 30 can be integrally formed from one piece of metal or joined by other techniques such as welding or bolting wherein mounting flange 26 fixedly holds guide 30. Guide 30 functions as a bearing support for a drive shaft 32, and therefore may assume other shapes.

As a means for bearing support, an upper bearing 34 is fixedly secured into the cylindrical tubular guide 30 at a top end 35 by press fit, for example, and a lower bearing 36 is also fixedly secured into cylindrical tubular guide 30 at a bottom end 37. A locking collar 38 has drive shaft 32 inserted therethrough. Collar 38 can be an integral part of upper bearing 34 so that upper bearing 34 prevents lateral motion of drive shaft 32 and also prevents longitudinal movement of collar 38. For example, some models of bearing set screws incorporated in the central sleeve.

A handle 40 is fixedly secured to drive shaft 32 to provide rotary motion to drive shaft 32. Other power means, suitable for portable devices, can be used to rotate drive shaft 32 such as an electric motor geared to drive shaft 32, not shown.

A telescoping arm 42 is positioned in a bore 44 and fixedly held in bore 44 by a set screw 46. Telescoping arm 42 is held at an angle $\theta$ from a perpendicular from drive shaft 32. As drive shaft 32 rotates, telescoping arm 42 forms conical slot 22 in grain 16 so that conical slot 22 is also at an angle $\theta$ from a perpendicular to the longitudinal axis of rocket motor 12. Telescoping arm 42 is centered upon longitudinal axis of drive shaft 32 so that conical slot 22 is not eccentric to grain bore 20.

Figure 2:
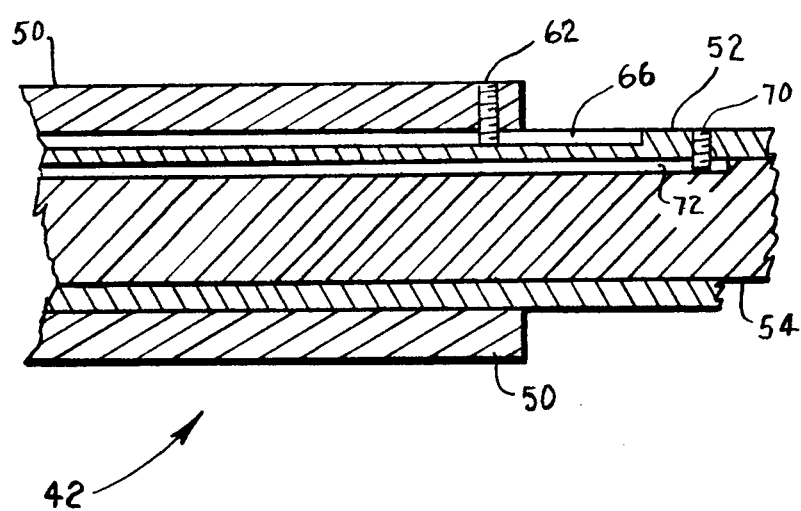
FIG. 2 is a partial cross-section of the telescoping arm of the conical slotting device of this invention.

Telescoping arm 42 includes a housing 50, a first extension arm 52, a second extension arm 54, and a cutter 56. Housing 50 fits within bore 44 and has a cylindrical cavity 58 therein with an opening in a front end 60 of housing 50. A first guide pin 62 is adjustably mounted in housing 50 and extends into cavity 58 to be further detailed. First extension arm 52, tubular in shape, fits closely within cavity 58 so that a first O-ring gasket 64 mounted about a lower end of first extension arm 52 forms a pressure seal with housing 50. As shown in FIG. 2, first extension arm 52 has a longitudinal guide slot 66 into which first guide pin 62 moveably translates.

Second extension arm 54, shaped as a solid cylinder, fits closely within first extension arm 52. A second O-ring gasket 68 is attached about the lower end of second extension arm 54 and forms a pressure seal with first extension arm 52. A second guide pin 70, adjustably mounted in first extension arm 52, extends through tubular shaped first extension arm 52 and moveably translates along a longitudinal second guide slot 72 as shown in FIG. 2 in greater detail.

Cutter 56 of telescoping arm 42 is fixedly attached to a front end of second extension arm 54 while a control cable 74 is fixedly attached to a back end of second extension arm 54. Guide slots 66 and 72 in cooperation with guide pins 62 and 70 insure that cutter 56 does not rotate about a longitudinal axis of first and second extension arms 52 and 54 respectively, and stop ejection of second extension arm 54 from first extension arm 52 and first extension arm 52 from housing 50. A pressurized fluid inserted into cavity 58 behind the ends of first and second extension arms 52 and 54, respectively, causes first and second extension arms 52 and 54, respectively, to be translated out of front opening 60 of housing 50. The amount of extension is determined by the amount of control cable 74 released into housing 50.

On top of drive shaft 32, drive shaft 32 being a tube, a cap 76 is fixedly attached and has a hole 78 therethrough centered on drive shaft 32. A threaded rod 80 is placed through hole 78 and has control cable 74 fixedly attached on the bottom end of threaded rod 80. A feed adjustment knob 82 is threaded onto threaded rod 80 and rotatably rests upon cap 76 so that when feed adjustment knob 82 is unthreaded, rod 82 translates into shaft 32.

Control cable 74, attached to the lower end of threaded rod 80, is also attached to the bottom end of second extension arm 54. Control cable 74 runs longitudinally through drive shaft 32 and enters a pressurized tube 84 through a pressure seal 86 attached on pressurized tube 84 and further travels along pressurized tube 84 and enters cavity 58. Pressurized tube 84 is fixedly attached to housing 50 and runs longitudinally through drive shaft 32 for providing pressurized fluid to cavity 58. Conventional means, not shown, are attached to pressurized tube 84 externally to drive shaft 32 so that rotation of drive shaft 32 does not effect the pressurized fluid entering pressurized tube 84 from an external source, not shown.

In operation, conical slotting device 10 is attached to motor case 14. The location at which cutter 56 begins to pare off grain 16 is adjusted by releasing locking collar 38 so that drive shaft 32 can be moved within upper bearings 34 and lower bearing 36. Pressurized fluid is fed through pressurized tube 84 and enters cavity 58 of housing 50 of telescoping arm 42. The pressurized fluid places an extending force upon both first and second extension arms 52 and 54, respectively. Movement of either is restrained by control cable 74. To pare out a conical slot, handle 40 is rotated while feed adjustment knob 82 is unthreaded. This allows cutter 56 to rotate through and be extended into grain 16 in a controlled manner. The maximum amount of extension of cutter 56 can be controlled by moving guide pins 62 and 70 or by measuring the amount of movement of threaded rod 80 after cutter 56 contacts grain 16. When grain 16 is rubber-like, proper operation of conical slotting device 10 allows a continuous strip of grain 16 to be removed.

Clearly, many modifications and variations of the present invention are possible in light of the above teachings and it is therefore understood, that within the inventive scope of the inventive concept, the invention may be practiced otherwise than specifically claimed.

What is claimed is:

1. A portable slotting device comprising:
   a housing for attachment to an object, said object having a longitudinal bore therein, said housing including a mounting flange through which attaching means secure said housing to said object and a guide fixedly attached to said mounting flange, said guide extending downwardly into said bore in said object;
   means for cutting a slot, said cutting means being rotatably secured to said housing, said cutting means able to form a conical slot in said object, said means for cutting including a drive shaft and a telescoping arm for cutting, said telescoping arm attached to said drive shaft, said drive shaft rotatably secured in said housing by bearing means, said drive shaft longitudinally locked into said housing by locking means secured to said bearing means, said drive shaft having an angled bore therein at a lower end for fixedly holding said telescoping arm in said drive shaft, and said drive shaft having a longitudinal bore therein, said telescoping arm for cutting further comprises an arm housing with a cavity running longitudinally therethrough with an opening in a front end of said arm housing, said arm housing having means for receiving pressurized fluid in a rear end; a first extension arm of tubular shape in sliding contact with said arm housing in said cavity, said first extension arm having a first pressure sealing means on a lower end in contact with said arm housing in said cavity, said first extension arm having a first pressure sealing means on a lower end in contact with said arm housing, said first extension arm having a first guide slot for receiving a first guide pin secured therein; a second extension arm, being rod shaped, in sliding contact within said tubular shape of said first extension arm, said second extension arm having a second pressure sealing means on a lower end in contact with said first extension arm, said second extension arm having a second guide slot horizontally positioned therein for receiving said second guide pin; and a cutter fixedly attached to said second extension arm, whereby pressurized fluid fed into said cavity of said arm housing causes said first and said second extension arms to be translated from said opening in said arm housing so that said cutter doesn't rotate relative to said arm housing and can translate a maximum predetermined distance from said arm housing;
   means secured to said cutting means for rotating said cutting means; and
   means for controlling the depth of said slot, said controlling means attached to said cutting means.

2. A portable slotting device as defined in claim 1 wherein said means for receiving pressurized fluid includes a tubular channel connected to said means for receiving pressurized fluid of said cutting means, said tubular channel having a coupling for connecting to an external source of pressurized fluid.

3. A portable slotting device as defined in claim 2 wherein said means for controlling depth includes means for adjusting depth, and a control cable connected to said adjusting means and connect to said second extension arm.

4. A portable slotting device as defined in claim 3 wherein said adjusting means includes an adjusting knob threaded to accept a threaded rod onto which said control cable is attached, said adjusting knob rotatably resting on said cutting means.

5. A portable slotting device as defined in claim 4 wherein said control cable and said tubular channel for providing pressurized fluid are partially located in a bore of said drive shaft of said rotating means, said control cable entering said tubular channel through a pressure seal fixedly attached to said tubular channel.

* * * * *